(12) United States Patent
Choi

(10) Patent No.: US 7,881,368 B2
(45) Date of Patent: Feb. 1, 2011

(54) METHOD FOR PARSING THE SIZE OF CONTENTS TO BE REPRODUCED IN A MOBILE COMMUNICATION DEVICE

(75) Inventor: Won Sik Choi, Seoul (KR)

(73) Assignee: LG Electronics, Inc., Seoul (KR)

( * ) Notice: Subject to any disclaimer, the term of this patent is extended or adjusted under 35 U.S.C. 154(b) by 1475 days.

(21) Appl. No.: 11/257,624

(22) Filed: Oct. 24, 2005

(65) Prior Publication Data

US 2006/0112415 A1 May 25, 2006

(30) Foreign Application Priority Data

Oct. 26, 2004 (KR) ............................... 85929/2004

(51) Int. Cl.
 *H04N 7/12* (2006.01)
 *H04N 7/16* (2006.01)
 *G06K 9/36* (2006.01)

(52) U.S. Cl. .................. 375/240.01; 725/139; 382/233

(58) Field of Classification Search ................ 375/240, 375/240.25, 240.18, 240.24; 382/232, 233, 382/236, 238, 239, 245–246, 250–253; 725/139, 725/100, 62
See application file for complete search history.

(56) References Cited

U.S. PATENT DOCUMENTS

| 6,072,479 | A | 6/2000 | Ryuichi | |
|---|---|---|---|---|
| 7,162,093 | B2 * | 1/2007 | Regunathan et al. | ........ 382/233 |
| 7,596,488 | B2 * | 9/2009 | Florencio et al. | ............ 704/208 |

FOREIGN PATENT DOCUMENTS

| EP | 1187460 | 3/2002 |
|---|---|---|
| JP | 2001-157204 | 6/2001 |
| JP | 2003-092752 | 3/2003 |
| JP | 2003-297015 | 10/2003 |
| JP | 2004-140575 | 5/2004 |
| JP | 2004-274694 | 9/2004 |
| KR | 10-2002-0027206 | 4/2002 |

* cited by examiner

*Primary Examiner*—Yon Couso
(74) *Attorney, Agent, or Firm*—Lee, Hong, Degerman, Kang & Waimey

(57) ABSTRACT

A method is provided for parsing the size of contents to be reproduced in a mobile communication device in order to accurately determine an actual size of the contents. By utilizing information related to the size of a video codec that is part of the file format of the contents, the size of the contents may be accurately determined, thereby enhancing reliability of the reproduction operation and preventing malfunction of the mobile communication device.

17 Claims, 3 Drawing Sheets

MPEG-4

H.263

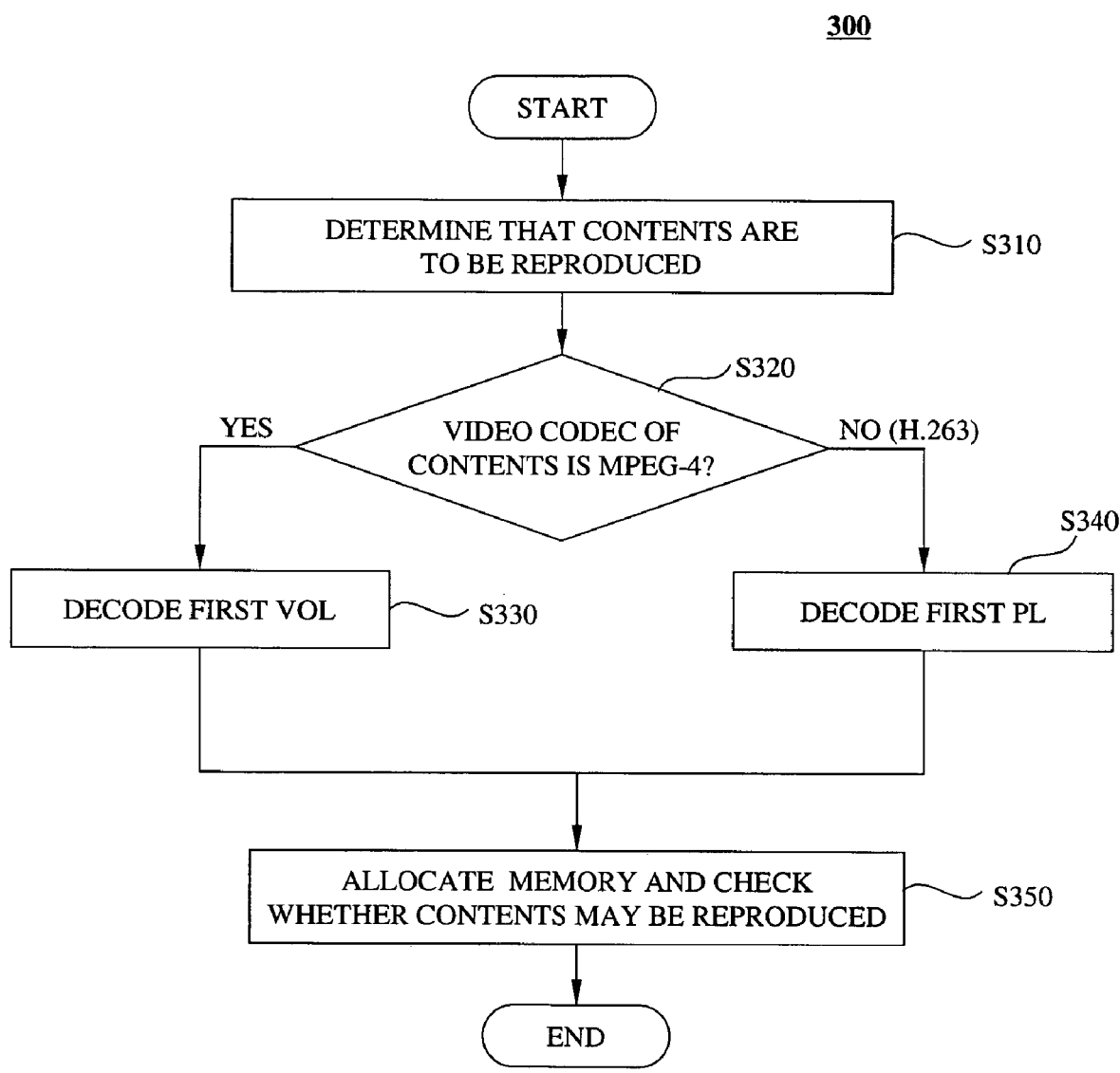

METHOD FOR PARSING THE SIZE OF CONTENTS TO BE REPRODUCED IN A MOBILE COMMUNICATION DEVICE

CROSS-REFERENCE TO RELATED APPLICATIONS

Pursuant to 35 U.S.C. §119(a), this application claims the benefit of earlier filing date and right of priority to Korean Application No. 85929/2004, filed on Oct. 26, 2004, the contents of which is hereby incorporated by reference herein in its entirety:

BACKGROUND OF THE INVENTION

1. Field of the Invention

The present invention relates to a mobile terminal and, more particularly, to a method for parsing the size of contents to be reproduced in a mobile communication device in order to accurately determine an actual size of the contents.

2. Description of the Related Art

Development of mobile communication techniques and mobile communication device fabrication techniques have enabled mobile terminal users to view video, listen to music, access the Internet or play video games with a mobile communication device, such as a mobile terminal. Mobile communication devices are no longer merely a means of communication, but also a mobile entertainment system.

Video, music, games, e-books or the like are referred as "mobile contents" or "contents" in an abbreviated form. When contents of the mobile terminal are reproduced, a determination whether the contents may be reproduced or if memory must be allocated is made according to a pixel size (width*height) of the contents.

In general, when the size of the contents is parsed to determine whether the contents may be reproduced or memory must be allocated, only the size information of the contents specified in a file format header of the contents is utilized. The file format header includes information indicating a type and size of contents and information related to arrangement of the data constituting the contents, thereby facilitating parsing of the size of the contents.

Although the size information of the contents that is specified in the file format header may be easily parsed, the indicated size may be smaller or greater than the actual size of the contents. Therefore, parsing the contents size by utilizing the information specified in the file format header may be unreliable.

Additionally, when it is desired to parse the contents, the information specified in the file format header is parsed first and then, if the contents can be reproduced and decoding is determined, a video codec is decoded and an audio codec is decoded. If the size of the contents specified in the file format header is different from the actual size of the contents, error processing cannot be performed smoothly when decoding.

In the mobile terminal, memory is allocated according to the size of the contents specified in the file format header. If the size of the contents specified in the file format header is smaller than the actual size, the size of the allocated space is smaller than the actual size of the contents and the contents cannot be stored in the memory, thereby disabling the mobile terminal. On the other hand, if the size of the contents specified in the file format header is larger than the actual size, an error would occur when reproducing the contents.

Therefore, there is a need for a method for accurately parsing the actual size of the contents of a mobile communication device that are to be reproduced. The present invention satisfies this and other needs.

SUMMARY OF THE INVENTION

The present invention is directed to a to a method for parsing the size of contents to be reproduced in a mobile communication device in order to accurately determine an actual size of the contents.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method that accurately determines the size of contents to be reproduced in a mobile communication device by utilizing information related to the size of a video codec that is part of the file format of the contents. Although the invention is described herein with regard to contents having a file format including a video codec in either MPEG-4 or H.263 format, it is contemplated that the invention may be utilized for determining the size of contents having a file format including a video codec in any format known in the prior art.

In one aspect of the invention, a method is provided for reproducing contents in a mobile communication device. The method includes utilizing information related to the size of a video codec that is part of the file format of the contents to determine the size of the contents.

It is contemplated that the information utilized to determine the size of the contents may be related to the size of one or more layers of the video codec considered representative of the size of each layer of the video codec. Preferably, a first layer of the video codec is utilized.

It is contemplated that the method may include determining the format of the video codec in order to determine the specific information that is utilized. Preferably, the format of the video codec is either MPEG-4 or H.263.

It is contemplated that one or more visual object layers (VOL) of a video codec in MPEG-4 format are decoded to determine the size of the contents. Preferably, a first video object layer is decoded.

It is contemplated that one or more picture layers (PL) of a video codec in H.263 format are decoded to determine the size of the contents. Preferably, a first picture layer is decoded.

In another aspect of the invention, a method is provided for reproducing contents in a mobile communication device. The method includes determining the format of a video codec that is part of the file format of the contents, determining the size of the contents by utilizing information related to the size of one or more specific layers of the video codec as representative of the size of each layer of the video codec, the specific layers that are used being determined according to the format of the video codec, allocating memory and determining whether to reproduce the contents according to the determined size of the contents.

Preferably, the format of the video codec is either MPEG-4 or H.263. It is contemplated that one or more visual object layers (VOL), preferably a first VOL, of a video codec in MPEG-4 format are decoded to determine the size of the contents. It is further contemplated that one or more picture layers (PL), preferably a first PL, of a video codec in H.263 format are decoded to determine the size of the contents.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein:

FIG. 3 illustrates a flow chart of a method for reproducing the contents of a mobile communication device according to one embodiment of the present invention.

DETAILED DESCRIPTION OF THE PREFERRED EMBODIMENTS

The present invention relates to method for parsing the size of contents to be reproduced in a mobile communication device in order to accurately determine an actual size of the contents. Although the present invention is illustrated with regard to contents having a file format including a video codec in either MPEG-4 or H.263 format, it is contemplated that the invention may be utilized for determining the size of contents having a file format including a video codec in any format known in the prior art.

In describing the present invention, if a detailed explanation for a related known function or construction is considered to be unnecessary, such explanation has been omitted but would be understood by those skilled in the art.

Figure 1:
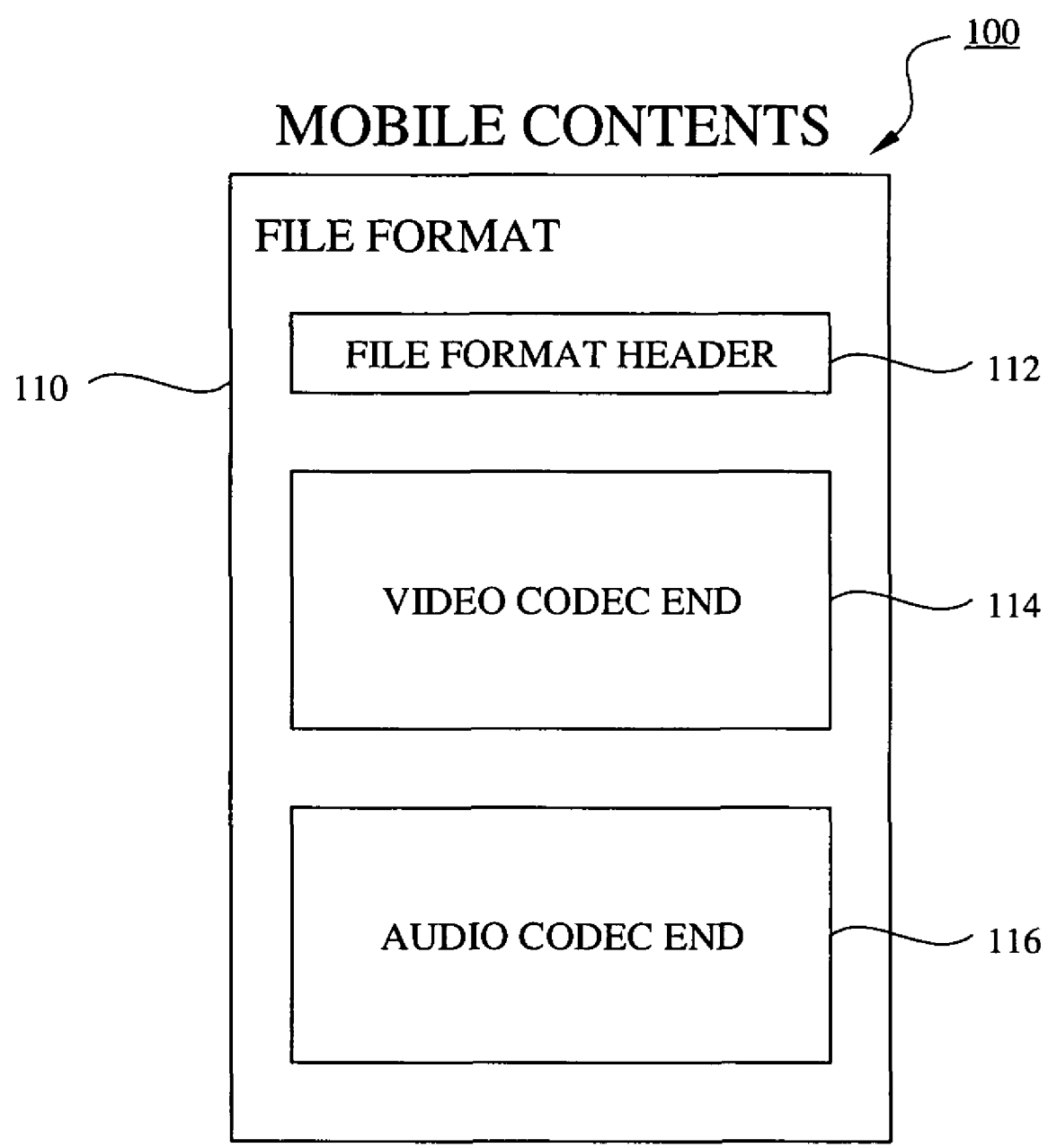
FIG. 1 illustrates the structure of the contents of a mobile communication device according to one embodiment the present invention.

As illustrated in FIG. 1, the image contents 100 in a mobile communication device include a file format 110 that is roughly divided into a video codec 114, an audio codec 116 and a file format header 112. The file format header 112 contains information related to the contents such as a pixel size of the contents and a codec type.

In order to increase the speed of a reproduction operation, it would be effective to analyze information in the file format header 112 and use the information for decoding and reproducing the files. However, since the size information specified in the file format header 112 may be unreliable, the present invention utilizes the size information of the contents specified in the video codec 114 in order to reliably determine the size of the contents and prevent possible malfunction of the mobile terminal due to the unreliability of the size information in the file format header.

Figure 2:
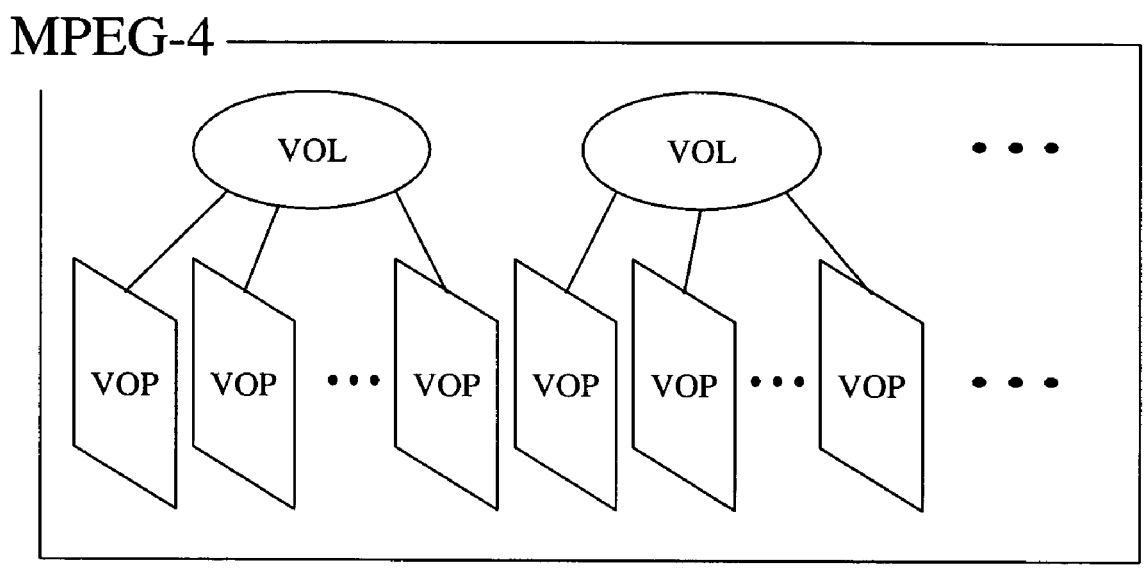
FIG. 2 illustrates the composition of a video codec that is part of the file format of the contents of a mobile communication device according to one embodiment of the present invention.
Figure 2:
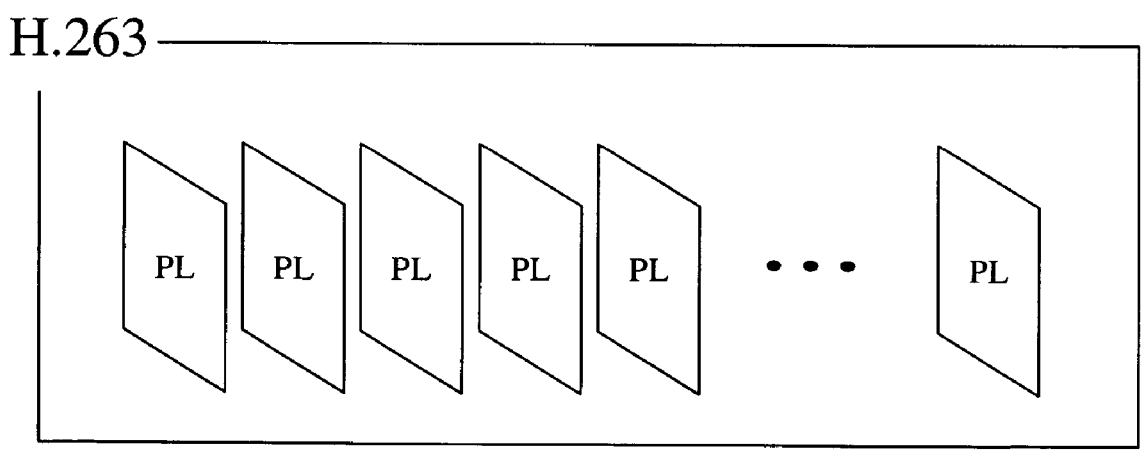

The video codec 114 may include MPEG-4 or H.263 format. FIG. 2 illustrates the general structure of the MPEG-4 and H.263 format.

As illustrated in FIG. 2, MPEG-4 format includes a visual object layer (VOL) covering several frames and a visual object plane (VOP) constituting the VOL, while H.263 format includes a picture layer (PL) existing at every frame. As indicated in the standard specification, 3GPP (3rd Generation Partnership Project) TS 26.244 v.0.1.3, the MPEG-4 format has the size information regarding the contents in the VOL, while H.263 format has the size information regarding the contents in the PL.

Generally, the size of each frame is the same within the same contents. Therefore, for the MPEG-4 format, a first VOL is decoded to determine the size of the contents, and for H.263 format, a first PL is decoded to determine the size of the contents. By allocating memory according to the determined size, it may be more accurately determined whether the contents can be reproduced.

FIG. 3 illustrates a flow chart of a method 300 reproducing the contents in a mobile communication device in accordance with a preferred embodiment of the present invention. The method 300 includes determining that the contents of a mobile communication device are to be reproduced (S310), determining a format of the video codec to be reproduced (S320), decoding either the first VOL (S330) or the first PL (S340) of the video codec and allocating memory and checking whether the contents may be reproduced (S350).

Once it is determined that the contents in the mobile communication device are to be reproduced in step S310, a processor in the mobile communication device determines, in step S320, whether a codec used for the contents is the MPEG-4 format or H.263 format.

If the codec is the MPEG-4 format, the processor decodes the first VOL and parses the size of the contents in step S330. If the codec is H.263 format, the processor decodes the first PL and parses the size of the contents in step S340.

According to the parsing result, memory is allocated and it is determined whether the contents may be reproduced in step S350.

The method of the present invention for reproducing the contents in a mobile communication device improves reliability of the parsing operation and prevents malfunction of the mobile communication device due to inaccurate allocation of memory.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for reproducing video contents in a mobile communication device including a processor, the method comprising:

decoding, by the processor, at least one layer of a video codec storing at least a portion of the video contents;

parsing, by the processor, size information of the decoded at least one layer;

determining, by the processor, a size of the video contents based on the parsed size information of the decoded at least one layer; and determining, by the processor, whether to reproduce the video contents in the mobile communication device, based on the determined size of the video contents, wherein the parsed size information of the decoded at least one layer is representative of a size of each layer of the video codec.

2. The method of claim 1, wherein determining the size of the video contents based on the parsed size information of the decoded at least one layer comprises utilizing the parsed size information of the decoded at least one layer of the video codec as representative of the size of each layer of the video codec.

3. The method of claim 2, wherein the at least one layer is a first layer of the video codec.

4. The method of claim 1, further comprising determining, by the processor, a format of the video codec, wherein the at least one layer of the video codec is decoded based on the determined format of the video codec.

5. The method of claim 1, wherein a format of the video codec is MPEG-4.

6. The method of claim 5, wherein decoding the at least one layer of the video codec comprises decoding at least one visual object layer of the MPEG-4 format of the video codec.

7. The method of claim 6, wherein the at least one visual object layer is a first visual object layer.

8. The method of claim 1, wherein a format of the video codec is H.263.

9. The method of claim 8, wherein decoding the at least one layer of the video codec comprises decoding at least one picture layer of the H.263 format of the video codec.

10. The method of claim 9, wherein the at least one picture layer is a first picture layer.

11. A method for reproducing video contents in a mobile communication device including a processor, the method comprising:

determining, by the processor, a format of a video codec storing the video contents;

decoding, by the processor, at least one layer of the video codec based on the determined format of the video codec;

parsing, by the processor, size information of the decoded at least one layer;

determining, by the processor, a size of the video contents based on the parsed size information of the decoded at least one layer;

allocating, by the processor, memory; and determining, by the processor, whether to reproduce the the video contents in the mobile communication device, based on the determined size of the video contents, wherein the parsed size information of the decoded at least one layer is representative of a size of each layer of the video codec.

12. The method of claim 11, wherein a format of the video codec is MPEG-4.

13. The method of claim 12, wherein the at least one layer is a visual object layer of the MPEG-4 format of the video codec.

14. The method of claim 13, wherein decoding the at least one layer of the video codec comprises decoding the visual object layer.

15. The method of claim 11, wherein a format of the video codec is H.263.

16. The method of claim 15, wherein the at least one layer is a picture layer of the H.263 format of the video codec.

17. The method of claim 16, wherein decoding the at least one layer of the video codec comprises decoding the picture layer.

* * * * *